W. E. SPARKS.

Assignor by mesne Assignments to M. Wheeler & Co.

REVERSIBLE LATCHES.

No. 7,844. Reissued Aug. 14, 1877.

Witnesses.

J. N. Chumney.

H. A. Litton.

Wm. E. Sparks.
Inventor
By Atty
Wm. E. Earle

N. PETERS. PHOTO-LITHOGRAPHER, WASHINGTON, D. C.

UNITED STATES PATENT OFFICE.

WILLIAM E. SPARKS, OF NEW HAVEN, CONNECTICUT, ASSIGNOR, BY MESNE ASSIGNMENTS, TO MALLORY, WHEELER & CO.

IMPROVEMENT IN REVERSIBLE LATCHES.

Specification forming part of Letters Patent No. 96,049, dated October 19, 1869; Reissue No. 7,844, dated August 14, 1877; application filed July 27, 1877.

*To all whom it may concern:*

Be it known that I, WM. E. SPARKS, of New Haven, in the county of New Haven and State of Connecticut, have invented a new Improvement in Reversible Latches; and I do hereby declare the following, when taken in connection with the accompanying drawings and the letters of reference marked thereon, to be a full, clear, and exact description of the same, and which said drawings constitute part of this specification, and represent, in—

Figure 2:
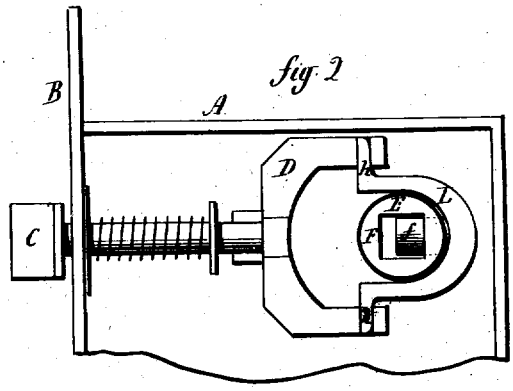
Figure 3:
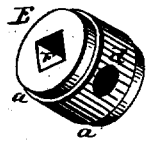
Figure 4:
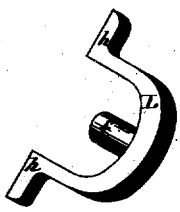

Figure, 1 a view of the latch portion of the lock with the face-plate removed, the parts in position as when the spindle is inserted; Fig. 2, the same, to illustrate the manner of reversing the latch; Fig. 3, a perspective view of the hub, and in Fig. 4, a perspective view of the follower, both detached.

This invention relates to an improvement in knob-latches, the object being to construct the latch so that the bolt may be reversed, to adapt the same latch to either a right or left hand door; and the invention consists in the combination, in a knob-latch, of a hub supported in the case independent of other parts of the mechanism, and constructed with a longitudinal spindle-seat, and with an opening transversely into said spindle seat, a yoke and latch-bolt swiveled thereto, and a follower constructed to engage the said yoke and hub, and with a portion thereof in such relative position to the opening in the spindle-seat that when the spindle is in its seat it will hold the follower and prevent the withdrawal of the latch-bolt, and so that when the spindle is removed it will allow the follower to be drawn outward with, and for the purpose of turning, the latch-bolt, so as to set it either for a right or left hand door.

To enable others skilled in the art to make and use my invention, I will proceed to describe the same, as illustrated in the accompanying drawings.

A is the case; B, the face-plate, of common construction. C, the latch-bolt, is arranged in the case, and pivoted or swiveled to the yoke D, also in the usual manner, and arranged with a suitable spring to throw the bolt from the case. E is the hub, (seen detached in Fig. 3,) which is of a cylindrical form, constructed so as to be held in its seat in the case independent of other parts of the mechanism of the latch, here represented as by a shoulder, *a*, upon each end, and formed with a spindle-seat, F, longitudinally through its center, for the insertion of the spindle, and with a transverse opening, *d*, (see Fig. 3,) through to the spindle-seat F.

L is the follower, constructed so as to set over the hub, and with a part, *f*, in such relative position to the transverse opening in the hub that when set over the hub and left free the said part may pass into the said opening in the hub, and extend into the spindle-seat, as seen in Fig. 2.

The follower is constructed with arms *h*, so as to operate upon the yoke of the latch-bolt in the usual manner.

Figure 1:
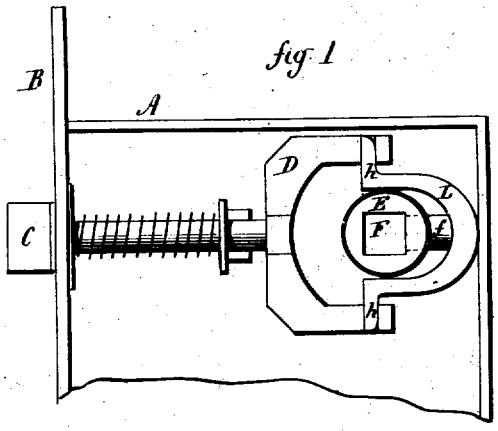

The normal condition of the latch is as seen in Fig. 1. When to be applied to the door to reverse the latch, if required, draw the latch-bolt from the case, as seen in Fig. 1, to the position seen in Fig. 2. Then the nose of the bolt, being free from the face-plate, may be turned to either the right or left. The spring will draw the bolt back into the case, as in Fig. 1, when set to the proper position.

When the latch-bolt is drawn from the case, it will be observed that the part *f* on the follower passes into the spindle-seat. Consequently, when the spindle is passed through the hub, the said part must be pressed out flush with the inner surface of the spindle-seat. Then the part *f* on the follower will bear against the spindle, so as to hold the follower in that position, and prevent the latch from extending beyond its proper position when upon the door.

I do not wish to be understood as broadly claiming a reversible latch, as I am aware there are many devices for accomplishing this object; but What I do claim as my invention, and desire to secure by Letters Patent, is—

The combination, in a knob-latch, of the following instrumentalities—to wit, first, a yoke with latch-bolt swiveled thereto; second, a hub supported in the case independent of other parts of the mechanism, and constructed with a longitudinal spindle-seat, and with an opening transversely into said spindle-seat; third, a follower constructed to engage the said yoke and hub, and with a portion thereof in such relative position to the opening in the spindle-seat that when the spindle is in its seat it will hold the follower, and when the spindle is removed it will allow the follower to be drawn outward with, and for the purpose of turning the latch-bolt, substantially as described.

WILLIAM E. SPARKS.

Witnesses:
WM. H. ANDREWS,
JOHN E. EARL.